US008117568B2

(12) United States Patent
Xiang et al.

(10) Patent No.: US 8,117,568 B2
(45) Date of Patent: Feb. 14, 2012

(54) APPARATUS, METHOD AND COMPUTER PROGRAM PRODUCT FOR FAST SIMULATION OF MANUFACTURING EFFECTS DURING INTEGRATED CIRCUIT DESIGN

(75) Inventors: Hua Xiang, Ossining, NY (US); Laertis Economikos, Wappingers Falls, NY (US); Mohammed F. Fayaz, Pleasantville, NY (US); Stephen E. Greco, Lagrangeville, NY (US); Patricia A. O'Neil, Newburgh, NY (US); Ruchir Puri, Baldwin Place, NY (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 12/237,727

(22) Filed: Sep. 25, 2008

(65) Prior Publication Data

US 2010/0077372 A1 Mar. 25, 2010

(51) Int. Cl.
*G06F 17/50* (2006.01)
*G06F 9/455* (2006.01)
(52) U.S. Cl. .......... 716/100; 716/126; 716/132; 703/14
(58) Field of Classification Search .................. 716/100, 716/126, 132; 703/14
See application file for complete search history.

(56) References Cited

U.S. PATENT DOCUMENTS

| | | | |
|---|---|---|---|
| 5,467,291 A * | 11/1995 | Fan et al. ......................... | 703/14 |
| 6,484,300 B1 | 11/2002 | Kim et al. ......................... | 716/7 |
| 6,766,283 B1 | 7/2004 | Goldman et al. .................. | 703/2 |
| 7,024,645 B2 * | 4/2006 | Sumikawa ..................... | 716/108 |
| 7,231,624 B2 | 6/2007 | Vuong et al. ..................... | 716/12 |
| 7,251,807 B2 | 7/2007 | Melvin, III et al. ............. | 716/21 |
| 7,254,792 B1 | 8/2007 | Rekhi et al. ......................... | 716/5 |
| 7,325,206 B2 | 1/2008 | White et al. ....................... | 716/4 |
| 7,721,237 B2 * | 5/2010 | Scheffer et al. ................ | 716/113 |
| 2005/0044515 A1 * | 2/2005 | Acar et al. ......................... | 716/5 |
| 2007/0214446 A1 | 9/2007 | Lavin et al. ....................... | 716/12 |
| 2008/0163141 A1 * | 7/2008 | Scheffer et al. .................... | 716/5 |

FOREIGN PATENT DOCUMENTS

| | | |
|---|---|---|
| JP | 2007-103634 | 4/2007 |
| WO | WO 99/25520 | 5/1999 |

OTHER PUBLICATIONS

"Cadence Accelerates Time-to-Volume for Advanced ICs with Model-Based, Variation-Aware Design Technologies; Provides WYNIWYG Capability", Cadence Design Systems, Inc., Sep. 12, 2011, 2 pgs.

* cited by examiner

*Primary Examiner* — Stacy Whitmore
*Assistant Examiner* — Magid Dimyan
(74) *Attorney, Agent, or Firm* — Harrington & Smith (57) ABSTRACT

Methods, apparatus and computer program products provide a fast and accurate model for simulating the effects of chemical mechanical polishing (CMP) steps during fabrication of an integrated circuit by generating a design of an integrated circuit; while generating the design of the integrated circuit, using a simplified model to predict at least one physical characteristic of the integrated circuit which results from a CMP processing step to be used during manufacture of the integrated circuit, wherein the simplified model is derived from simulations performed prior to the design generation activities using a comprehensive simulation program used to model the physical characteristic; predicting performance of the integrated circuit using the predicted physical characteristic; and adjusting the design of the integrated circuit in dependence on the performance prediction.

22 Claims, 5 Drawing Sheets

APPARATUS, METHOD AND COMPUTER PROGRAM PRODUCT FOR FAST SIMULATION OF MANUFACTURING EFFECTS DURING INTEGRATED CIRCUIT DESIGN

TECHNICAL FIELD

The invention generally concerns methods, apparatus and computer program products for simulating and designing integrated circuits, and more particularly concerns methods, apparatus and computer program products for simulating the effects of fabrication processes on the electrical performance of integrated circuits during the design phase.

BACKGROUND

As CMOS technology continues to scale, integrated circuit designs are increasingly affected by the variability in the back end of the line. In order to achieve acceptable design quality, theses variations should be well understood so that their impact can be taken into account in circuit and layout design flow.

Chemical Mechanical Planarization ("CMP") is a primary technique to planarize layout surfaces in order to establish reliable multilevel copper interconnects, and constitutes one or more steps in a typical semiconductor manufacturing process. In modern manufacturing processes, after depositing a new layer of material on previous layers of material along with an insulating dielectric, a chemical mechanical polishing step removes excess materials and planarizes a target surface with a combination of chemicals and mechanical forces. The smooth surface is nessary to maintain photolithographic depth of focus for subsequent steps and also to ensure establishing reliable multilevel copper interconnects.

However, due to dishing and erosion, thickness variations still exist after a CMP process. Intra-chip copper interconnect variation can be on the order of 20-40%. In order to capture thickness variations after a CMP process, a number of CMP simulators have been proposed, and several EDA vendors have developed industrial tools (comprehensive simulation tools) to simulate CMP processes.

As feature sizes drop below 90 nm, boundaries between design and manufacturing become blurred, and Design for Manufacturability ("DFM") has been established as an important concept in nanometer circuit design. It is highly desired to incorporate the effects of CMP processes in layout and design so that the CMP-induced copper thickness variations, which may affect wire resistance and capacitance, and further lead to timing changes, can be accurately captured during the design stage. In the "2D", RC extractors have to set a large conservative full chip guard band (around ±20%) in order to cover both systematic and random thickness variations in copper interconnects.

It is known that full chip CMP modeling can accurately predict systematic variations in metal layers and help to eliminate the systematic variation guard band leaving only a relatively small random variation guard band. This helps to reduce the pessimism on timing estimation and increase the overall net delay accuracy. References shows that when comparing the worst case analysis, the total capacitance with CMP-aware timing is smaller by up to 12% of the capacitance when compared to the traditional approach. The traditional approach does not consider CMP effects. Also the delay of 93% of the critical path is decreased when the CMP effects are considered during timing. Therefore, CMP simulation can help to improve timing analysis and make aggressive design possible. However, although several accurate CMP models exist, there are still significant challenges in applying these models to the design stage due to the following three reasons.

First, modeling must reflect the effect of dummy fills. In order to get accurate CMP predictions, a proposed model requires a full design that includes not only every component in the design, but also dummy fills. However, in large-scale integrated circuit designs, the hierarchical approach is widely adopted such that designers may work only on part of the design, and no full chip information is available. Furthermore, dummy fills are required by almost all foundries for local metal density adjustment. (Some foundries also have requirements on cheesing holes). Fills and holes are usually inserted in the product layout post design stage, and the fills (holes) have a large impact on layout smoothness. Simulation results show that standard deviations on copper interconnect thickness variations can change by 58% as a result of incorporation of dummy fills. In short, a full design with fills and holes is required for accurate CMP prediction.

Second, the execution time of a full chip CMP prediction is long, measured by hours. However, the design process is an iterative process, and multiple iterations are required to refine and optimize the design. This means that the CMP copper interconnect model may be called multiple times. So the run time of the CMP model has to be short enough to facilitate a tight and timely design schedule. A long execution time for a CMP model can greatly restrict its application in the design stage.

At the late design stage, incremental optimizations are highly desired in order to honor existing designs while improving the performance and tackling design changes. In general, these incremental operations are applied only in small, localized regions of a design, and the majority of the design stays unchanged. Ideally, CMP predictions should be updated for only those changed regions. However, the CMP models have to consider the long range impacts, and will still take the full chip information for a full chip prediction, which takes a long time to complete.

Accordingly, those skilled in the art seek methods, apparatus and computer program products that overcome these limitations of the prior art.

SUMMARY OF THE INVENTION

The foregoing and other problems are overcome, and other advantages are realized, in accordance with the following embodiments of the invention.

A first embodiment of the invention is a method comprising: generating a design of an integrated circuit; while generating the design of the integrated circuit, using a simplified model to predict at least one physical characteristic of the integrated circuit which results from a processing step to be used during manufacture of the integrated circuit, wherein the simplified model is derived from simulations performed prior to the design generation activities using a comprehensive simulation program used to model the physical characteristic; predicting performance of the integrated circuit using the predicted physical characteristic; and adjusting the design of the integrated circuit in dependence on the performance prediction.

A second embodiment of the invention is a method comprising: selecting a representative integrated circuit; using a comprehensive simulation tool to predict a physical characteristic of the representative integrated circuit resulting from a manufacturing step of the particular manufacturing process; partitioning the layout into grid tiles and classifying the tiles into classes based on tile metrics; using the predictions of the comprehensive simulation program to generate a simplified model of the physical characteristic that result from the manufacturing step for each tile class; and using at least one of the simplified models of the physical characteristic created from the representative integrated circuit instead of the comprehensive simulation program during integrated circuit design to adjust an integrated circuit design.

A third embodiment of the invention is a computer program product comprising a computer readable memory medium tangibly embodying a computer program, the computer program executable by digital processing apparatus, wherein when the program is executed the computer program is configured to generate a design of an integrated circuit; to use a simplified model to predict at least one physical characteristic of the integrated circuit which results from a processing step to be used during manufacture of the integrated circuit; to predict performance of the integrated circuit using the predicted physical characteristic; and to adjust the design of the integrated circuit in dependence on the performance prediction.

A fourth embodiment of the invention is a computer program product comprising a computer readable memory medium tangibly embodying a computer program, the computer program executable by digital processing apparatus, wherein when the computer program is executed the computer program is configured to partition a representative integrated circuit into grid tiles and classify the tiles into classes based on tile metrics; to use a comprehensive simulation tool to predict a physical characteristic of the representative integrated circuit resulting from a manufacturing step of the particular manufacturing process; to use the predictions of the comprehensive simulation program to generate a simplified model of the physical characteristic that result from the manufacturing step for each tile class; and to use at least one of the simplified models of the physical characteristic created from the representative integrated circuit during circuit design to adjust an integrated circuit design.

A fifth embodiment of the invention is an apparatus comprising: a memory storing a computer program; and a processing apparatus coupled to the memory and configured to execute the computer program, wherein when the computer program is executed operations are performed, the operations comprising: generating a design of an integrated circuit; while generating the design of the integrated circuit, using a simplified model to predict at least one physical characteristic of the integrated circuit which results from a processing step to be used during manufacture of the integrated circuit, wherein the simplified model is derived from simulations performed prior to the design generation activities using a comprehensive simulation program used to model the physical characteristic; predicting performance of the integrated circuit using the predicted physical characteristic; and adjusting the design of the integrated circuit in dependence on the performance prediction.

In conclusion, the foregoing summary of the embodiments of the invention is exemplary and non-limiting. For example, one of ordinary skill in the art will understand that one or more aspects or steps from one embodiment can be combined with one or more aspects or steps from another embodiment to create a new embodiment within the scope of the present invention. Further, one skilled in the art will appreciate that steps of a method embodiment can be implemented as functions in an apparatus embodiment, and vice versa.

BRIEF DESCRIPTION OF THE DRAWINGS

The foregoing and other aspects of these teachings are made more evident in the following Detailed Description of the Invention, when read in conjunction with the attached Drawing Figures, wherein:

FIG. 1 depicts features of an integrated circuit created during manufacturing;

DETAILED DESCRIPTION OF THE INVENTION

To address these issues in existing CMP models, the present invention uses a fast empirical CMP model based on simulation results from an industry CMP analysis tool, which does CMP predictions based on tile metrics (e.g., density, wire width, wire spacing, wire length etc.). The fast new model of the invention successfully addresses the above-identified three difficulties. The new model receives prefill (prehole) designs as input, and generates post fill (hole) thickness maps for copper interconnects. Accordingly, copper interconnect thickness can be calculated on each tile. This allows local changes to be well captured and easily updated.

In the invention, an industry CMP analysis tool, which accurately provides full chip, multi-level topography predictions for copper ECD and CMP, is used to generate CMP simulation data for particular manufacturing processes. For this kind of CMP simulator, the simulation accuracy can be higher than 90% for 65 nm Cu CMP process. The simulation data from the CMP simulator forms the starting point for developing a simplified CMP model in accordance with the invention.

Figure 1A:
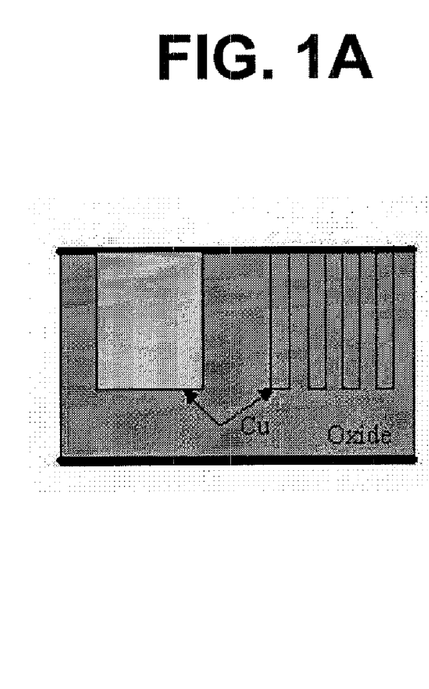
FIG. 1A depicts an ideal case of a single layer without dishing or erosion.
Figure 1B:
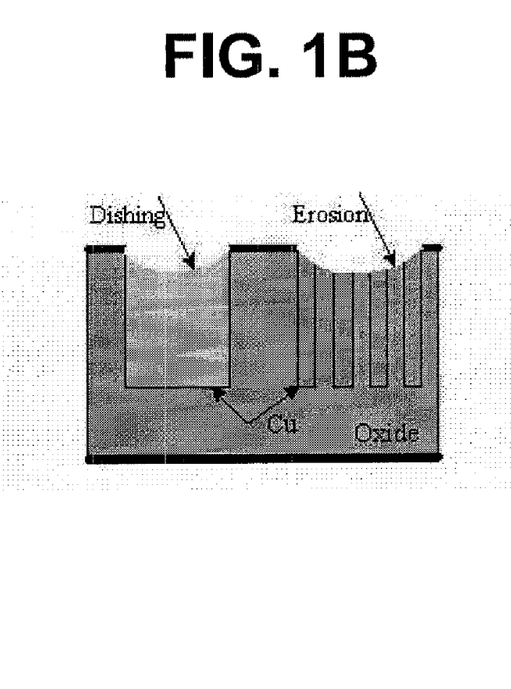
FIG. 1B depicts a case with dishing and erosion.
Figure 1C:
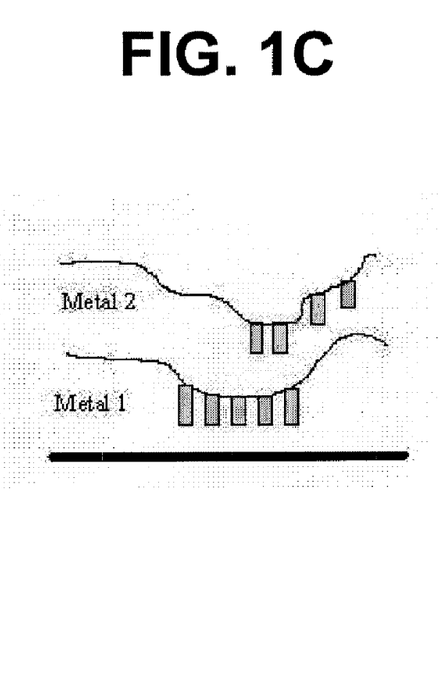
FIG. 1C depicts a case with cumulative non-conformity.

CMP planarization is not only affected by the manufacturing process, but also clearly related to the design itself. For example, wide wires tend to "dish" and thin dense wires tend to erode as shown in FIG. 1. FIG. 1A is a depiction of an ideal case without dishing and erosion. FIG. 1B is a depiction of a case with dishing and erosion. FIG. 1C depicts how cumulative non-uniformity on higher metal levels increases the thickness variations.

Experiments show that the variation can be correlated very accurately with pattern dependencies in the design itself. Almost all foundries require an effective metal density to be satisfied for better layout planarity and yield optimization. To adjust the local pattern density, dummy fills (and sometimes cheesing holes) are used in the foundry industry. Dummy fills are electrically inactive features. They are inserted in sparse regions to enhance the local pattern density. On the other hand, cheesing holes are made in wide wires in order to reduce the local pattern density and alleviate the degree of dishing. In short, both dummy fills and cheesing holes are designed to improve layout smoothness.

Both dummy fills and cheesing holes have large impacts on layout smoothness. The simulation results on two designs with the validated 65 nm Cu model show that the Cu thickness variation increases dynamically without fills and holes. For example, the standard deviations on Cu thickness variations can change by 58% as a result of incorporation of dummy fills. And the variations are doubled as a result of excluding both dummy fills and cheesing holes. In short, in order to get a reasonable CMP prediction, fill (hole) impacts must be included. Otherwise, metal densities and widths need to be heavily ground rule restricted (i.e., to eliminate holes).

The calculation of the calibrated CMP model in one embodiment of the invention is based on pattern dependencies of the design. To characterize the design patterns, the whole layout is partitioned into grid tiles. Different tile metrics are calculated to reflect the design pattern of each tile. These tile metrics can be derived tile by tile (i.e., tile-independent), and supports incremental update. Therefore, the tile metrics for a given tile can be derived independently.

Although the validated CMP 65 nm Cu model from a comprehensive CMP simulator is accurate, several improvements made in the present invention increase its usefulness in a design flow: These improvements address the fact that real-world designs require fill (hole) insertions and thus these must be reflected in the model; non-incremental calculation; and long execution time of comprehensive CMP simulation tools.

Each of these problems is resolved in embodiments of the present invention. To address the first problem, an exemplary embodiment of the model takes as input tile metrics that are derived from a prefill (prehole) design, i.e., the tile metrics are calculated directly from a design without fills and holes. The output model of the present invention, however, is the Cu thickness of each tile on the same design with fills and holes inserted. In other words, a model made in accordance with the invention simultaneously predicts the impact of tile metrics and fill hole insertions on Cu thickness. It is assumed that a set of standard fill (hole) insertion rules are applied throughout the design, and the impact of these rules on Cu thickness can be predicted without knowing the details of these rules. This assumption has been validated in large industrial designs.

To address the second problem, a model in accordance with the invention predicts the Cu thickness of each tile independently and ignores the interaction between neighboring tiles. In an iterative design flow, this feature allows incremental updates to Cu thickness for tiles changed in one design stage, without affecting the other unchanged tiles. It is acknowledged that neighboring tiles do affect each other to some degree, but it is only a secondary factor. For most industrial designs, tile metrics change gradually across neighboring tiles, and the Cu thickness of a tile is mainly determined by the properties of the tile itself. Similarly, the multi-level impacts are not considered in the model of the invention for simplicity. It is noted that the model targets to be applied in the design stage, while most of the industry CMP simulators are to be used in the post-design stage. Still, the validation results demonstrate that, for large industrial applications, the model of the invention gives accurate predictions of Cu thickness while considering tiles independently.

To address the third problem, a machine learning approach is adopted to train a black-box function to directly capture the impact of tile metrics and fill (hole) insertions on Cu thickness, without going through the time-consuming CMP simulation steps as in the prior art. An idea that inspired this work is the conjecture that, using sufficient training data in the form of prefill (Dre-hole) title metrics and their corresponding Cu thickness after fill (hole) insertions, one can learn a mathematical model to accurately predict Cu thickness for previously unseen designs.

The CMP simulator is used to generate data to train the model of the invention. Given a prefill (prehole) design D, a proprietary industrial-strength tool is used to insert fills and holes to generate a detailed design H. H is then fed into the CMP simulator and the predicted Cu thickness $\vec{t}$ is recorded. $\vec{t}$ is used as the output training data and the prefill (prehole) design D as the input training data for the model of the invention. A set of tile metrics (e.g., density, wire width, wire spacing, wire length etc.), which are used by the CMP simulator for CMP prediction, is extracted from D. For illustration, it is assumed that the set includes three tile metrics: $\vec{a}$, $\vec{b}$, and $\vec{c}$. Suppose design D has a total of n tiles. Here $\vec{t}$, $\vec{a}$, $\vec{b}$, and $\vec{c}$ are n-dimensional column vectors, with each element $t_i$, $a_i$, $b_i$, and $c_i$ ($1 \leq i \leq n$) are corresponding to the data for a tile.

It is assumed that Cu thickness $\vec{t}$ is a quadratic function of tile metrics $\vec{a}$, $\vec{b}$, and $\vec{c}$;

$$t_i = \varepsilon_i + \beta_1 + \beta_2 a_i + \beta_3 b_i + \beta_4 c_i + \beta_5 a_i^2 + \beta_6 b_i^2 + \beta_7 c_i^2 + \beta_8 a_i b_i + \beta_9 a_i c_i + \beta_{10} b_i c_i \quad (1 \leq i \leq n), \quad (1)$$

where $\in_i$ is the prediction error, and $\beta_1, \beta_2, \ldots, \beta_{10}$ are model parameters to be trained.

The following notations are used:

$$\vec{\beta} = (\beta_1, \beta_2, \ldots, +\beta_{10},)^T$$

$$\vec{\in} = (\in_1, \in_2, \ldots, +\in_n)^T$$

$$\vec{x}_i = (1, a_i, b_i, c_i, a_i^2, b_i^2, c_i^2, a_i b_i, a_i c_i, b_i c_i)$$

$$X = (\vec{x}_1, \vec{x}_2, \ldots, \vec{x}_n)^T$$

Here $\vec{\beta}$ is the model parameter vector. $\vec{\in}$ is the error vector. $\vec{x}_i$ is a 10-dimensional vector corresponding to the i-th tile metrics of the i-th tile, where $1 \leq i \leq n$. X is an n-by-10 matrix that denotes the tile metrics for all n tiles.

Equation 2 is a matrix form of Equation 1. It captures the relationship between Cu thickness and tile metrics for n tiles.

$$\vec{t} = X\vec{\beta} + \vec{\in} \quad (2)$$

The purpose of linear regression using least-square analysis is to find $\vec{\beta}$ that minimizes the sum of the squares of the errors:

$$\text{minimize} \sum_{i=1}^{n} \varepsilon_i^2. \quad (3)$$

It can be shown that this optimization problem has the closed form solution $\vec{\beta}^*$ in Equation 4. It is also the maximum likelihood estimation of the parameter vector $\vec{\beta}^*$, assuming that the errors $\in_i$ are normally distributed.

$$\vec{\beta}^* = (X^T X)^{-1} X^T \vec{t} \quad (4)$$

The training data generated by the CMP simulator is used to calculate $\vec{\beta}^*$, which in turn is used to predict Cu thickness for previously unseen designs. For a new tile s, its three tile metrics $a_s$, $b_s$, and $c_s$ are extracted. An input vector $\vec{x}_s$ is then formed, and its Cu thickness $t_s$ is predicted as below:

$$\vec{x}_s = (1, a_s, b_s, c_s, a_s^2, b_s^2, c_s^2, a_s b_s, a_s c_s, b_s c_s) \quad (5)$$

$$t_s = \vec{x}_s^T \cdot \vec{\beta}^* \quad (6)$$

The simplified discussion above assumes that a single unified model can predict Cu thickness for all tiles. However, tiles may have dramatically different properties, and hence it requires a sophisticated model to predict Cu thickness for all kinds of tiles. On the other hand, it is well known that complex models have a number of problems such as overfitting and being hard to train.

Domain knowledge is leveraged in embodiments of the invention to address this challenge by combining classification with data regression. Tiles can be categorized into different classes based on their properties, and a separate model can be built to predict Cu thickness within each class. The total number of classes is a small constant. Therefore, the number of models is also small. For the specific problem of Cu thickness prediction, it is found that the classifiers based on rules constructed by domain experts are very effective. For example, based on the tile metrics a, b and c, we can define the rules as follows. The three classes are LOW, HIGH, NORM, AL, AM, AH, BH and CL are constants specified by a domain expert or learned by a classifier.

```
IF ( a < AL ) THEN { class = LOW }
ELSE IF ( a > AH ) THEN { class = HIGH}
ELSE IF ( b > BH || c < CL ) {
    THEN IF ( a < AM ) THEN { class = LOW }
    ELSE { class = HIGH}
}
ELSE { class = NORM }
```

First, tiles from different metal layers may fall into different classes since different metal layers have different thickness requirements. Within each metal layer, a tile is assigned to one of three classes based on its tile metrics a, b and c. Based on the metal layers and the rules above, tiles in the training data are assigned to different classes, and the training data within the same class are used to train a model for this class (see Equation 4). Given a new tile s, first its corresponding class is found based on its metal layer and the rules above, and then the model for that class is used to predict its Cu thickness (See Equation 6).

To validate the proposed approach, M1 and M2 from a test chip which includes a wide variety of pattern structures are selected as the sample data for M1 and Mx, respectively. Also other five 65 nm real designs are used to verify the accuracy of the presented CMP model. The Cu thickness of each tile from the model is compared against the CMP simulator prediction results. For both M1 and Mx predictions, the results from the model are very close to those from the CMP simulator with an average error less than 1.6%. The M1 model has an even smaller average error (<0.3%) since both the model and the CMP simulator model do not need to consider the multiple layer impacts for M1. For Mx model, the CMP simulator will take the multiple layer impacts into the prediction calculation, while the model of the invention ignores this factor for simplicity.

Figure 2:
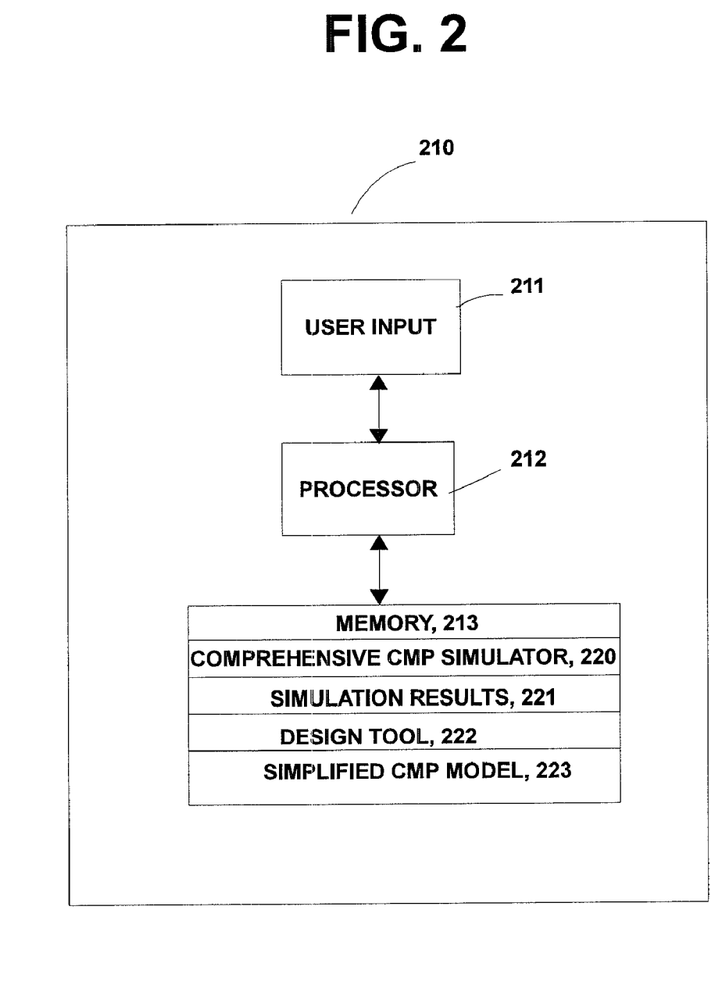
FIG. 2 depicts a system in accordance with the invention.

FIG. 2 depicts a system configured in accordance with the invention that is capable of practicing methods in accordance with the invention. The system 200 comprises a computer 210. The computer 210 receives input and commands from user input 211. Processor 212 of computer 210 is coupled to memory 213. Processor 212 is configured to execute comprehensive CMP simulator 220 to generate simulation results that form a starting point for developing a simplified CMP model in accordance with the invention. The simulation results 221 are saved to memory 213. Processor 212 uses the saved data to develop the simplified CMP model. The simplified CMP model 223 is used by VLSI design tool 222 during VLSI design activities to simulate effects of manufacturing steps like CMP on real-world performance so that VLSI designs can be adjusted during design.

Figure 3:
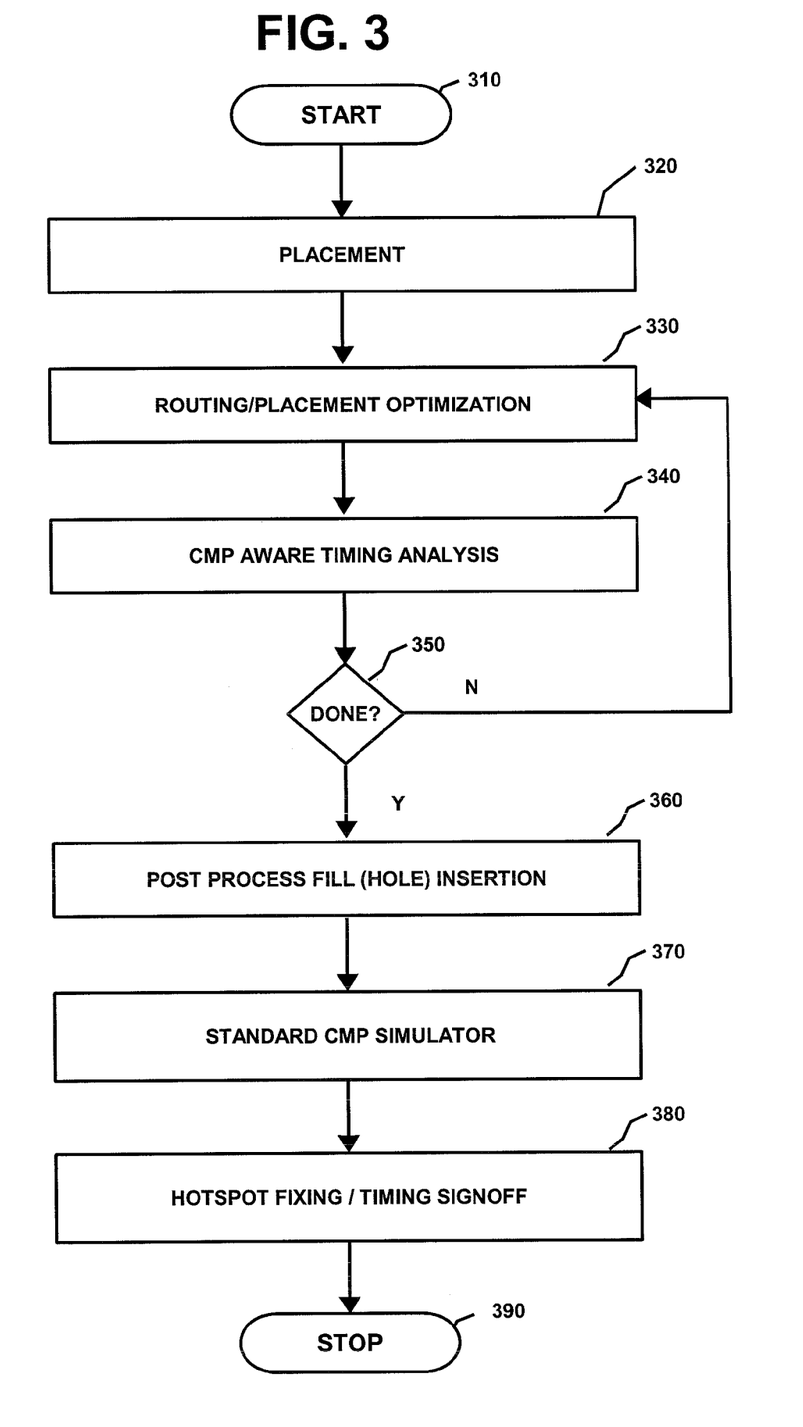
FIG. 3 is a flowchart depicting a method in accordance with the invention.

The proposed fast simple CMP Cu model can easily be integrated into the design flow. As shown in a method depicted in FIG. 3 operating in accordance with the invention, the method starts at 310. Then, at 320, placement is performed. Next, at 330, routing and optimization is performed. Next, at 340, CMP aware timing analysis is performed using a simplified model constructed in accordance with the invention. Then, at 350, it is decided whether design is completed. If not, the method returns to 330. If so, the method proceeds to 360, where post processing fill (hole) insertion is performed. Next, at step 370, standard CMP simulation is performed. Then, at 380, hotspot fixing and timing signoff is performed. The method stops at 390.

In the current practice, the timing calculation assumes the same Cu thickness for the whole layer since no feasible CMP Cu model can be used. This leads to a large guard band for RC extraction in order to cover the thickness variations. Armed with this fast CMP model, the systematic thickness variations can be reasonably well captured, and it helps to reduce the pessimism on timing estimation and increase the overall net delay accuracy. After the design is done, dummy fills (and holes) are inserted in the post design process. At this stage, the accurate CMP simulator model can be applied for timing sign off and hot spot fixing.

The model of the invention successfully addresses the three drawbacks of the existing CMP models. The input of the proposed model does not require dummy fill (hole) insertion information, while the predicted tile Cu thickness is indicative of a post fill (hole) methodology. Therefore, this model can be used for CMP aware timing analysis during the design stage. The model of the invention is based on the tile properties (e.g., density, wire width, spacing, etc.), which can be quickly calculated during the routing stage. Based on these tile properties, the model prediction calculation takes only a constant time for each tile. The fast running time allows multiple applications of the model during design iterations. Moreover, the model calculation is tile-independent. So the design changes can be well captured tile by tile, and it is suitable for incremental designs. For a certain CMP process, only one set of models (i.e., one model for one class), are needed and the models can be pre-calculated following the proposed approach. Once the models are built, when making predictions for previously unseen data, the method computes the output tile property as a function of the input tile properties, and they can be applied on all designs using the corresponding CMP process.

Thus, a fast effective CMP model based on the accurate simulation results from an industry CMP simulator has been described. The experimental results validate that this model has high accuracy. This fast model of the invention overcomes the three major drawbacks of the current sophisticated CMP models (i.e., full design input, long run time and non-incremental prediction), and it can be easily integrated into the design for multiple iterations of optimizations.

Figure 4:
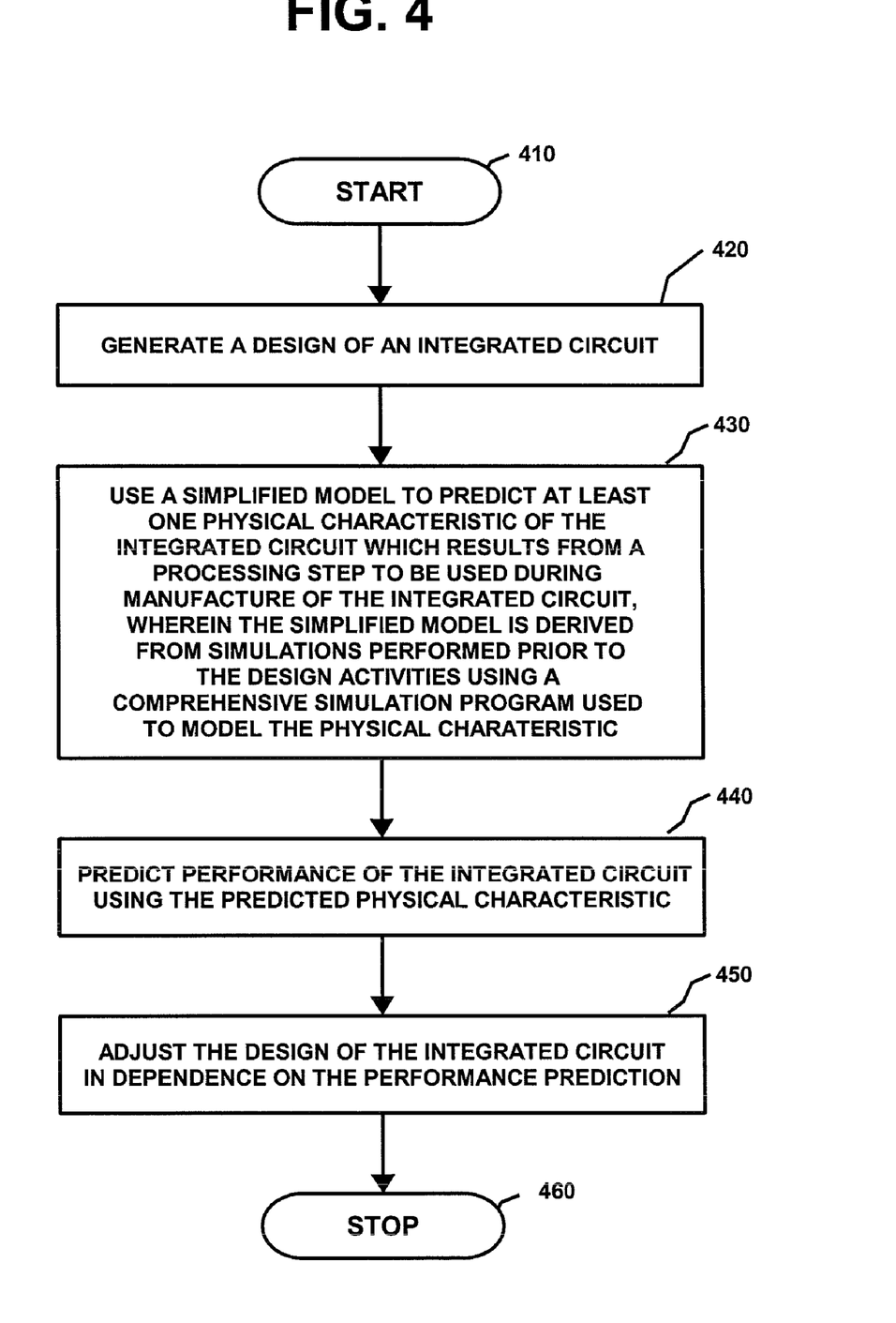
FIG. 4 is a flowchart depicting a method in accordance with the invention.
Figure 5:
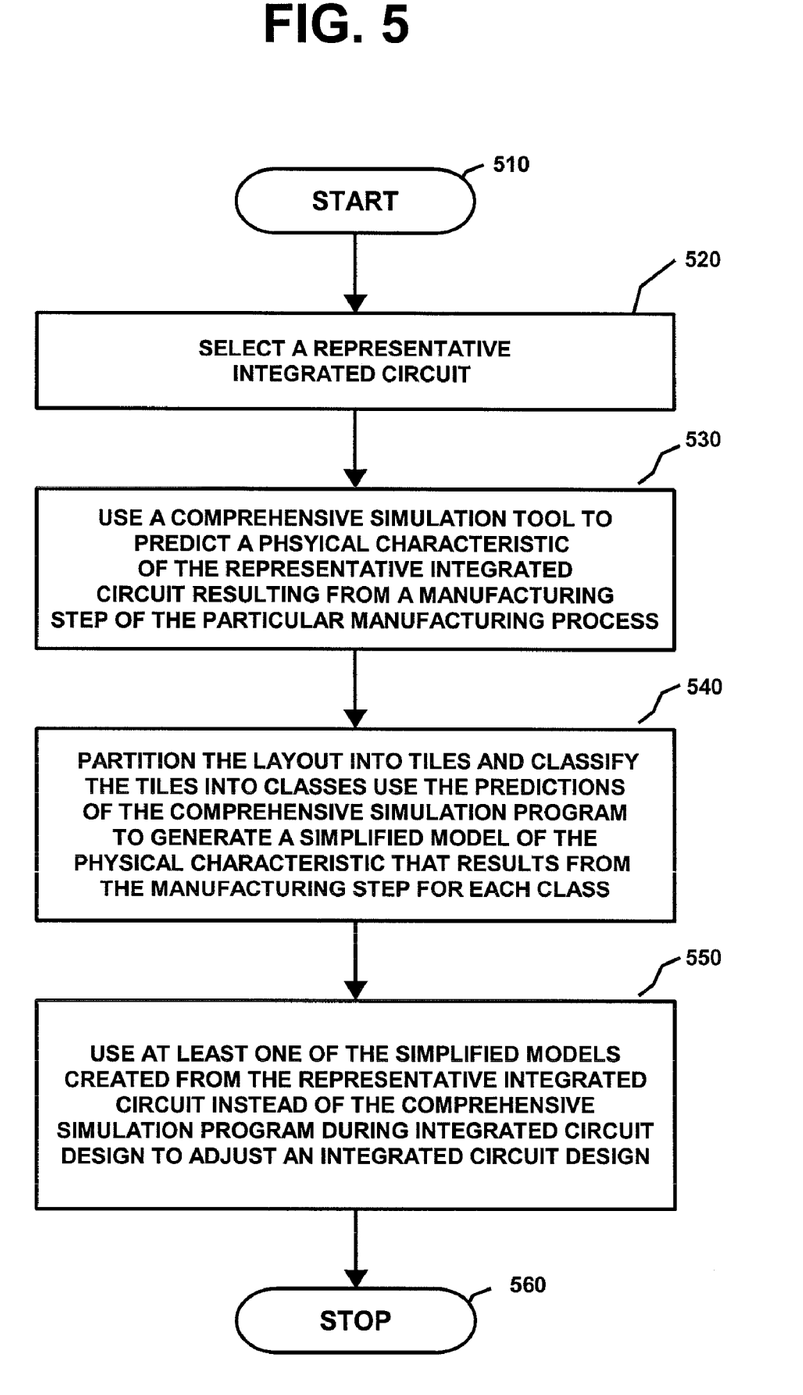
FIG. 5 is a flowchart depicting another method in accordance with the invention.

In summary, FIGS. 4 and 5 are flowcharts depicting methods operating in accordance with the invention. The method of FIG. 4 starts at step 410. Then, at 420, a design program being executed in response to user command and responding to user input generates a design of an integrated circuit. Next, at 430, the design program uses a simplified model to predict at least one physical characteristic of the integrated circuit which results from a processing step to be used during manufacture of the integrated circuit, wherein the simplified model is derived from simulations performed prior to the design activities using a comprehensive simulation program used to model the physical characteristic. Then, at 440, the design program predicts performance of the integrated circuit being designed using the predicted physical characteristic. Next, at 450, the design program adjusts the design of the integrated circuit in dependence on the performance prediction. The method stops at 470.

In one variant of the method depicted in FIG. 4, the physical characteristic is wire thickness.

In another variant of the method depicted in FIG. 4, the processing step is chemical mechanical polishing.

In a further variant of the method depicted in FIG. 4, the processing step is electrochemical deposition.

In yet another variant of the method depicted in FIG. 4, the simplified model reflects an effect of a modification to be made to the design of the integrated circuit to improve ease of manufacture.

In a still further variant of the method depicted in FIG. 4, the modification comprises fills made to adjust local metal density of the design.

In another variant of the method depicted in FIG. 4, the modification comprises holes added to adjust local metal density of the design.

The method of FIG. 5 starts at 510. Then, at 520, a program operating in accordance with the invention selects a representative integrated circuit. Next, at 530 the program uses a comprehensive simulation tool to predict a physical characteristic of the representative electric circuit resulting from a manufacturing step of the particular manufacturing process. Next, at 540, the program partitions the layout into grid tiles and classifies the tiles into classes based on tile metrics. Then the program uses the predictions of the comprehensive simulation program to generate a simplified model of the physical characteristic that results from the manufacturing step for each tile class. Then, at 550, the program uses at least one of the simplified models of the physical characteristic created from the representative integrated circuit instead of the comprehensive simulation program during integrated circuit design to adjust an integrated circuit design.

In one variant of the method depicted in FIG. 5, the physical characteristic is wire thickness.

In another variant of the method depicted in FIG. 5, the manufacturing step is chemical mechanical polishing.

In a further variant of the method depicted in FIG. 5, the manufacturing step is electrochemical deposition.

In yet another variant of the method depicted in FIG. 5, the method further comprises:
Partitioning the layout into tiles and classify the tiles into classes according to tile metrics.

In a still further variant of the method depicted in FIG. 5, the method further comprises: receiving a proposed integrated circuit design; splitting the proposed integrated circuit design into tiles; for each tile of the proposed integrated circuit design, selecting a class that most closely matches the tile; and using the corresponding simplified model of the tile class to model the physical characteristic of the particular tile.

Thus it is seen that the foregoing description has provided by way of exemplary and non-limiting examples a full and informative description of the best apparatus and methods presently contemplated by the inventors for implementing a fast simulation of manufacturing effects during integrated circuit design. One skilled in the art will appreciate that the various embodiments described herein can be practiced individually; in combination with one or more other embodiments described herein; or in combination with methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A method comprising:
   receiving a first design of an integrated circuit, where the first design comprises a prefill and prehole impacted design;
   using, by a processor, a simplified model to predict at least one physical characteristic of the first design of the integrated circuit which results from a processing step to be used during manufacture of the integrated circuit,
   wherein the simplified model is derived from simulations performed using a comprehensive simulation program used to model the physical characteristic,
   where using the simplified model to predict the at least one physical characteristic comprises:
      partitioning the first design of the integrated circuit into grid tiles;
      calculating for each of at least one of the grid tiles tile metrics which reflect design patterns of the tile;
      classifying the each of the at least one of the grid tiles into classes based on the tile metrics; and
      modeling independently for the each of the at least one of the grid tiles, based on the simplified model, the physical characteristic of the each of the at least one of the grid tiles, where the predicted physical characteristic predict the impact of at least one of: fill and hole insertions,
      where the simplified model comprises a plurality of separate models and an individual separate model is used for each class to predict the at least one physical characteristic of a tile of the class;
   predicting performance of the integrated circuit using the predicted physical characteristic; and
   adjusting the first design of the integrated circuit in dependence on the performance prediction.

2. The method of claim 1 wherein the physical characteristic is wire thickness.

3. The method of claim 1 wherein the processing step is chemical mechanical polishing.

4. The method of claim 1 wherein the processing step is electrochemical deposition.

5. The method of claim 1 wherein the simplified model reflects an effect of a modification to be made to the first design of the integrated circuit to improve ease of manufacture.

6. The method of claim 5 wherein the modification comprises fills made to adjust local metal density of the first design.

7. The method of claim 5 wherein the modification comprises holes added to adjust local metal density of the first design.

8. The method of claim 1, further comprises using the adjusted first design to time a sign off.

9. The method of claim 1, further comprises using the adjusted first design, to time hot spot fixing.

10. The method of claim 1, where receiving the first design comprises receiving user input and, in response to the user input, generating the first design.

11. The method of claim 1, where modeling the physical characteristic of the each of the at least one of the grid tiles takes constant time per tile.

12. The method of claim 1, where classifying the each of the at least one of the grid tiles into the classes is further based on a metal layer of a tile.

13. The method of claim 1, where the adjusted first design is a second design and further comprising:

using the simplified model to predict at least one second physical characteristic of the second design of the integrated circuit, where predicting the at least one second physical characteristic comprises updating only the tiles affected when adjusting the first design; and predicting performance of the integrated circuit using the predicted second physical characteristic.

14. A non-transitory computer program product comprising a computer readable memory medium tangibly embodying a computer program, the computer program executable by digital processing apparatus, wherein when the program is executed the computer program is configured:

to receive a first design of an integrated circuit, where the first design comprises a prefill and prehole impacted design;

to use a simplified model to predict at least one physical characteristic of the first design of the integrated circuit which results from a processing step to be used during manufacture of the integrated circuit;

where, when using the simplified model to predict the at least one physical characteristic, the computer program is further configured:

to partition the first design of the integrated circuit into grid tiles;

to calculate for each of at least one of the grid tiles tile metrics which reflect design patterns of the tile;

to classify the each of the at least one of the grid tiles into classes based on the tile metrics; and to model independently for the each of the at least one of the grid tiles, based on the simplified model, the physical characteristic of the each of the at least one of the grid tiles, where the predicted physical characteristic predict the impact of at least one of fill and hole insertions, where the simplified model comprises a plurality of separate models and an individual separate model is used for each class to predict the at least one physical characteristic of a tile of the class;

to predict performance of the integrated circuit using the predicted physical characteristic; and to adjust the first design of the integrated circuit in dependence on the performance prediction.

15. The computer program product of claim 14 wherein the physical characteristic is wire thickness.

16. The computer program product of claim 14 wherein the processing step is chemical mechanical polishing.

17. The computer program product of claim 14 wherein the processing step is electrochemical deposition.

18. The computer program product of claim 14 wherein the processing step comprises fills made to adjust local metal density.

19. The computer program product of claim 14 wherein the processing step comprises addition of holes made to adjust local metal density.

20. The computer program product of claim 14, where classifying the each of the at least one of the grid tiles into the classes is further based on a metal layer of a tile.

21. An apparatus comprising: a memory storing a computer program; and a processing apparatus coupled to the memory and configured to execute the computer program, wherein when the computer program is executed operations are performed, the operations comprising:

receiving a first design of an integrated circuit, where the first design comprises a prefill and prehole impacted design;

using a simplified model to predict at least one physical characteristic of the first design of the integrated circuit which results from a processing step to be used during manufacture of the integrated circuit, wherein the simplified model is derived from simulations performed using a comprehensive simulation program used to model the physical characteristic, where using the simplified model to predict the at least one physical characteristic comprises:

partitioning the first design of the integrated circuit into grid tiles;

calculating for each of at least one of the grid tiles tile metrics which reflect design patterns of the tile;

classifying the each of the at least one of the grid tiles into classes based on the tile metrics; and modeling independently for the each of the at least one of the grid tiles, based on the simplified model, the physical characteristic of the each of the at least one of the grid tiles, where the predicted physical characteristic predict the impact of at least one of fill and hole insertions, where the simplified model comprises a plurality of separate models and an individual separate model is used for each class to predict the at least one physical characteristic of a tile of the class;

predicting performance of the integrated circuit using the predicted physical characteristic; and adjusting the first design of the integrated circuit in dependence on the performance prediction.

22. The apparatus of claim 21, where classifying the each of the at least one of the grid tiles into the classes is further based on a metal layer of a tile.

* * * * *